United States Patent
Yandle, II et al.

(10) Patent No.: US 11,946,545 B1
(45) Date of Patent: *Apr. 2, 2024

(54) RESCUE MECHANICAL SEAL AND METHOD

(71) Applicant: S. Elwood Yandle, II, New Orleans, LA (US)

(72) Inventors: S. Elwood Yandle, II, New Orleans, LA (US); S. Elwood Yandle, III, Belle Chasse, LA (US)

(73) Assignee: S. E. Yandle, II, New Orleans, LA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/149,519

(22) Filed: Jan. 3, 2023

Related U.S. Application Data (63) Continuation of application No. 16/683,711, filed on Nov. 14, 2019, now Pat. No. 11,608,894.

(60) Provisional application No. 62/767,289, filed on Nov. 14, 2018.

(51) Int. Cl.
*F16J 15/00* (2006.01)
*F04C 27/00* (2006.01)
*F16C 33/80* (2006.01)

(52) U.S. Cl.
CPC ........... *F16J 15/008* (2013.01); *F04C 27/005* (2013.01); *F16C 33/805* (2013.01)

(58) Field of Classification Search
CPC .......... F16J 15/002; F16J 15/06; F16J 15/008; F04C 27/005; F16C 33/805
See application file for complete search history.

(56) References Cited

U.S. PATENT DOCUMENTS

| | | | | |
|---|---|---|---|---|
| 3,025,070 | A * | 3/1962 | Copes | F16J 15/38 277/408 |
| 4,127,310 | A * | 11/1978 | Werner | F16J 15/187 92/165 R |
| 8,033,549 | B2 * | 10/2011 | Huang | F16J 15/3484 277/408 |
| 11,608,894 | B1 * | 3/2023 | Yandle, II | F16J 15/008 |
| 2006/0010646 | A1 * | 1/2006 | Bushey | B60B 33/0042 16/35 R |
| 2009/0283974 | A1 * | 11/2009 | Groom | F16C 33/74 277/575 |
| 2016/0130878 | A1 * | 5/2016 | Cobern | E21B 7/062 175/45 |

* cited by examiner

*Primary Examiner* — Eugene G Byrd
*Assistant Examiner* — L. Susmitha Koneru
(74) *Attorney, Agent, or Firm* — Garvey, Smith & Nehrbass, Patent Attorneys, L.L.C.; Charles C. Garvey, Jr.; Fabian M. Nehrbass (57) ABSTRACT

The present invention provides a method of replacing a failed pump seal of a pump having a pump housing and a rotating pump shaft. As part of the method, there is provided a specially configured rescue seal. The rescue seal is placed on the pump shaft above the failed seal so that the pump shaft extends through both the failed seal and the rescue seal. In order to affix the rescue seal to the pump shaft and above the failed seal, a plurality of studs are first attached to the pump housing after removing some of the bolts that fasten the failed seal to the pump housing. The failed seal is then secured to the studs with nuts. Nuts are then placed on the studs to secure the rescue seal to the studs above the failed seal.

6 Claims, 12 Drawing Sheets

Section A-A

FIG. 12
Detail A

FIG. 11

Section A-A

RESCUE MECHANICAL SEAL AND METHOD

CROSS-REFERENCE TO RELATED APPLICATIONS

This application claims the benefit of U.S. Provisional Patent Application Ser. No. 62/767,289, filed on 14 Nov. 2018, which is hereby incorporated herein by reference. Priority of U.S. Provisional Patent Application Ser. No. 62/767,289, filed on 14 Nov. 2018 is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to an improved rescue mechanical seal that can be placed above an existing failed seal and without removing the failed seal.

2. General Background of the Invention

Pumps are typically used to offload fluid products from vessels (e.g., barges). U.S. Pat. No. 7,699,579 shows an example of such a pump. U.S. Pat. No. 7,699,579 is hereby incorporated herein by reference. Products that have low boiling points create vapor pressure. When a mechanical seal on a pump of a barge loaded with a low boiling product fails, replacing the failed seal becomes a problem. Removing the failed seal allows vapors (of a generally hazardous product) to escape the barge in potentially large volumes.

BRIEF SUMMARY OF THE INVENTION

The present invention soles this problem of a failed seal by adding a "rescue seal" to the pump shaft above the existing failed mechanical seal without removing it. The vapor leak rate will thus not increase while putting the pump back in service. For seals with an overhead bearing assembly or OBA, no modifications are necessary to install. The present invention limits damage to the environment. The present invention limits exposure of personnel to chemicals.

The present invention provides a method of replacing a failed pump seal of a pump having a pump housing and a rotating pump shaft. As part of the method, there is provided a specially configured rescue seal.

The rescue seal is placed on the pump shaft above the failed seal. The pump shaft extends through both the failed seal and the rescue seal as the failed seal is not removed. In order to affix the rescue seal to the pump shaft and above the failed seal, a plurality of studs are first attached to the pump housing after removing some of the bolts that fasten the failed seal to the pump housing. The failed seal is then secured to the studs with nuts. Nuts are then placed on the studs to secure the rescue seal to the studs at a position above the failed seal. In one embodiment, some but not all of the fasteners that secure the failed seal to the housing are removed. For example, if four (4) bolts or fasteners secure the failed seal to the shaft, only two are initially removed and replaced with threaded studs. After securing the failed seal to the two studs, the other fasteners or bolts can be removed and replaced with additional studs. The rescue seal is then attached to the four (4) studs with nuts.

In one embodiment, the pump housing includes a pump discharge head and the studs are connected to the pump discharge head.

In one embodiment, nuts attached to the studs secure both the failed seal and the rescue seal to the pump housing and in sealing contact with the pump shaft.

In one embodiment, the rescue seal has recesses that are receptive of fasteners on the rescue seal in step.

Incorporated herein by reference are other patent applications we have filed for related inventions, including U.S. patent application Ser. No. 16/664,345, filed 25 Oct. 2019, for "LOW PROFILE OVERHEAD BEARING ASSEMBLY FOR PUMP BEARING ASSEMBLY" and U.S. patent application Ser. No. 15/729,388, filed 10 Oct. 2017, for "Mechanical Pump Seal". However, this is not a continuation or continuation-in-part of any other patent application.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

FIGS. 1-15 show a preferred embodiment of the apparatus of the present invention designated generally by the numeral

10. Preferably, the apparatus of the present invention is made of stainless steel, steel, brass, or other suitable material. Rescue seal apparatus 10 can be used to maintain pump P in service without the need for removal of the failed seal. The rescue seal apparatus is preferably sized and shaped according to the dimensions of the pump on which it is used, and can be adapted to accommodate different pumps. Preferably, the dimensions are custom to each seal as needed, though the most common dimensions would be those make to file the 2250, 1875, and Chesterton Pumps, along with any other suitable designs. Pump P has a pump shaft 45, pump housing 60 and failed seal 50 that is to be rescued with rescue seal apparatus 10. In FIGS. 1-13, rescue seal apparatus 10 has a lowermost seal sleeve 11. Sleeve 11 has an outer generally cylindrically shaped surface 12, and a sleeve bore 40. A plurality of rotating face springs 13 are mounted to sleeve 11 at openings 14 in annular skirt 15. Preferably, there are between 4 and 12 face springs. More preferably, there are 6 face springs. In a preferred embodiment, there is at least one opening 14 for each rotating face spring 13.

Skirt 15 has a lower larger diameter section 16 and an upper smaller diameter section 17. Preferably, lower diameter section 16 has a diameter ranging from 2.875" to 3". Most preferably, the lower diameter section 16 has a diameter of 2.938". Preferably, upper smaller diameter section 17 has a diameter ranging from 2.688" to 2.75". Most preferably, the upper, smaller diameter section 17 has a diameter of 2.728". Notches 18 in the larger diameter section 16 and receptive of lower projections 19 on rotating face driver 20. Rotating face driver 20 has upper projections 21 that interlock with notches 22 in rotating seal face 23.

Figure 1:
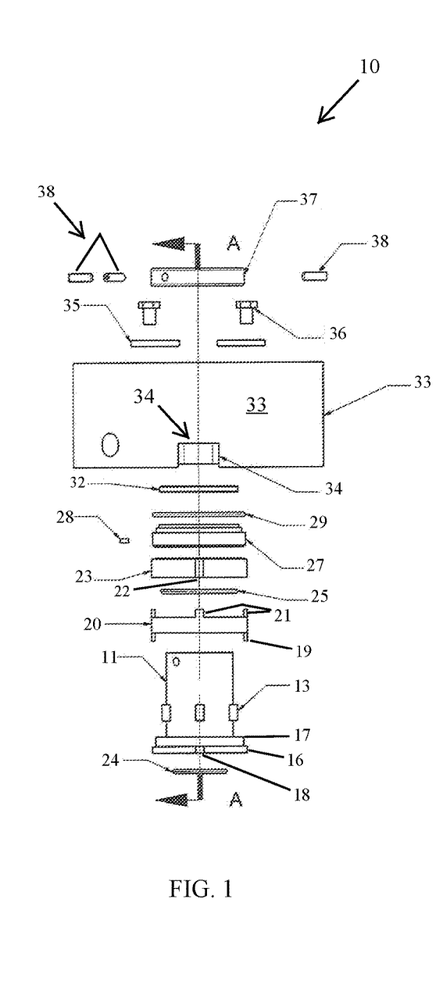
FIG. 1 is an exploded elevation view of a preferred embodiment of the apparatus of the present invention.
Figure 2:
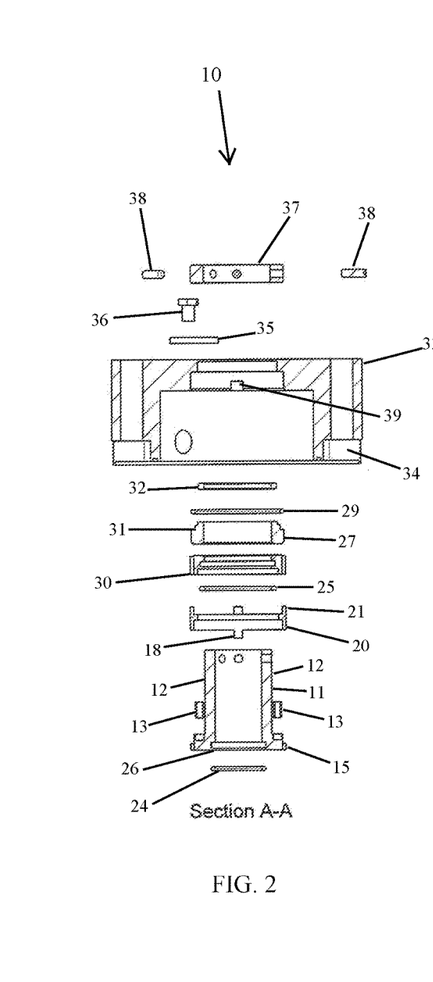
FIG. 2 is an exploded sectional view of a preferred embodiment of the apparatus of the present invention.
Figure 3:
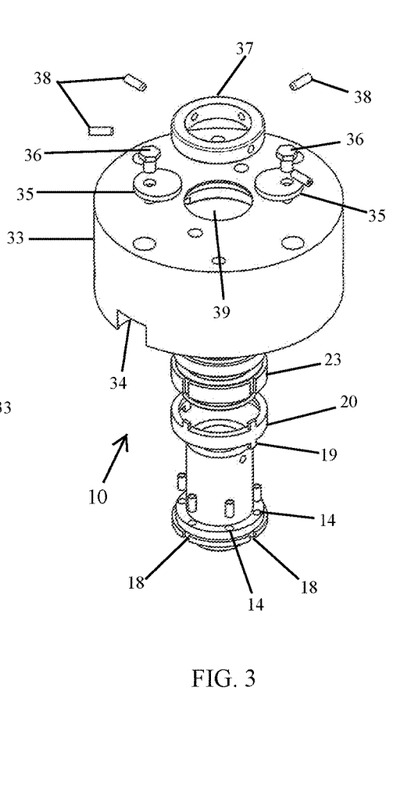
FIG. 3 is an exploded perspective view of a preferred embodiment of the apparatus of the present invention.
Figures 4, 5:
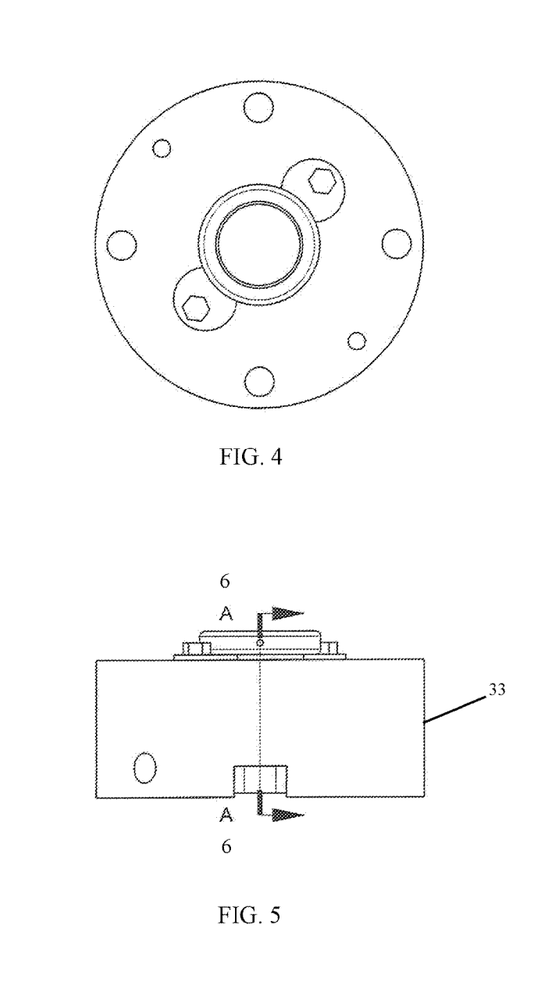
FIG. 4 is a fragmentary top view of a preferred embodiment of the apparatus of the present invention.
FIG. 5 is a fragmentary elevation view of a preferred embodiment of the apparatus of the present invention.
Figure 6:
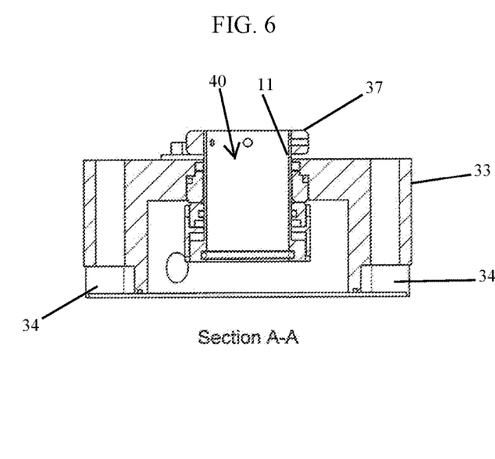
FIG. 6 is sectional view taken along lines 6-6 of FIG. 5.
Figure 7:
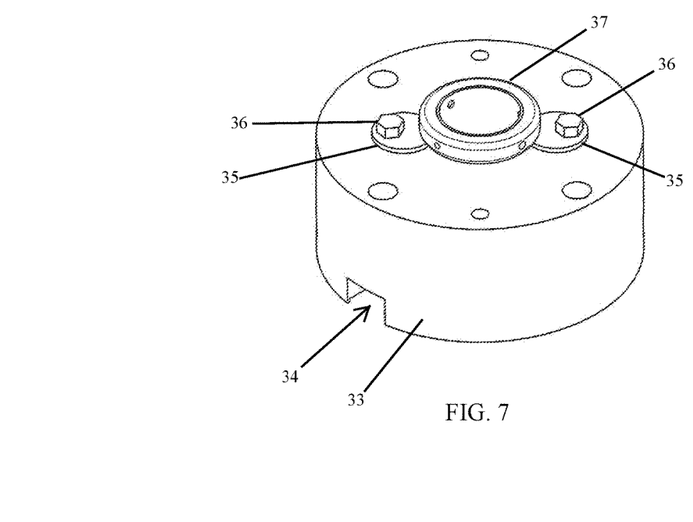
FIG. 7 is a partial perspective view of a preferred embodiment of the apparatus of the present invention.

O-ring 24 fits annular recess 26 at the lower end portion of seal sleeve 11 as seen in FIGS. 1-2. O-ring 25 is provided that fits annular recess 30 in monolithic rotating seal face 23. O-ring 29 fits annular recess 31 of stationary seal face 27. Anti-rotation pin 28 inserts into stationary seal face 27. Stationary seal face 27 along with O-ring 29 are inserted into seal cover 33. A half-moon recess 39 is machined into seal cover 33 beyond the outside diameter of the stationary seal face 27. Anti-rotation pin 28 is inserted into this recess 39. As the rotating face turns, anti-rotation pin 28 ensures the stationary seal face 27 does not turn.

The crash bushing (also known as the "throttle bushing") 32 presses into seal cover 33, has clearance over sleeve 11, and is used to limit the amount of product that can leak out of a failed seal 50. Being made of a thermoplastic, its second purpose is to keep the metal parts from coming into contact with each other which could cause heat or sparks igniting flammable products. Seal cover 33 has recesses or cutouts 34 that fit over the nuts/bolts/fasteners that connect failed seal 50 to pump housing 60 (see FIGS. 1-3, 5-8, and 14-15).

Seal cover 33 is fitted with preload spacers 35 and bolt spacer retainers 36. Drive collar 37 attaches to pump shaft 45 with set screws 38.

Figure 8:
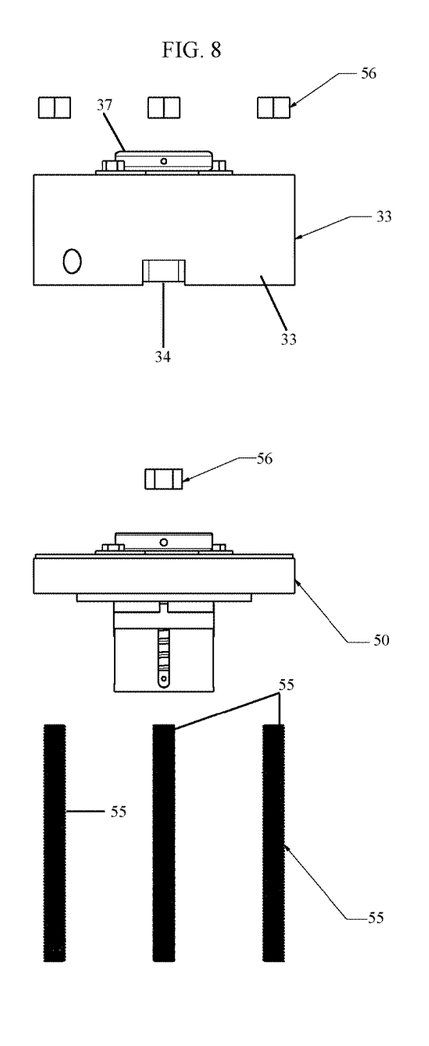
FIG. 8 is an exploded elevation view of a preferred embodiment of the apparatus of the present invention.
Figure 9:
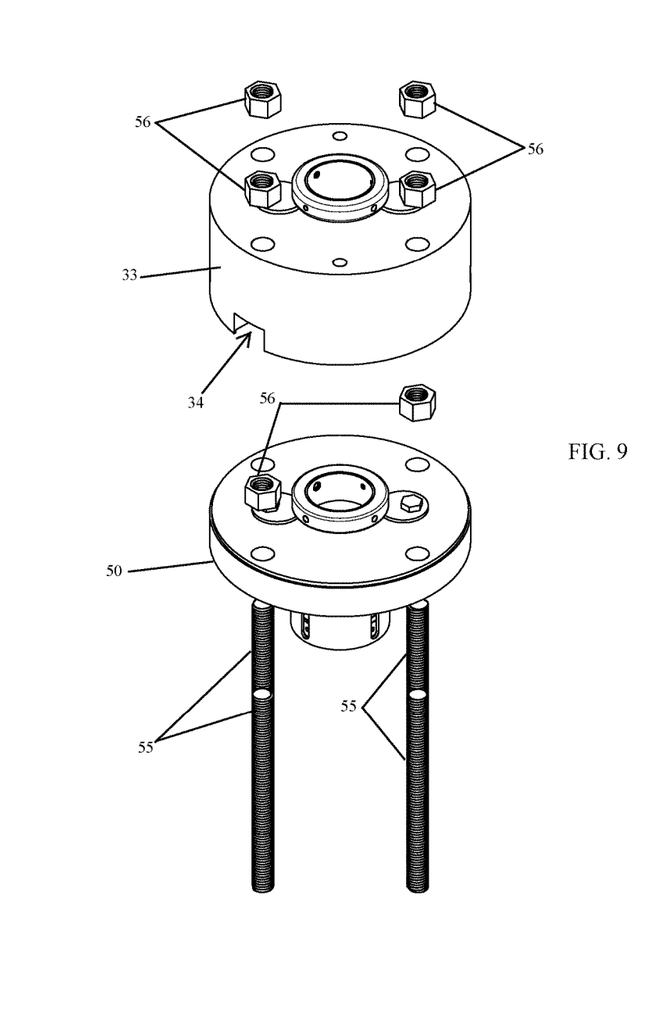
FIG. 9 is an exploded perspective view of a preferred embodiment of the apparatus of the present invention.
Figure 10:
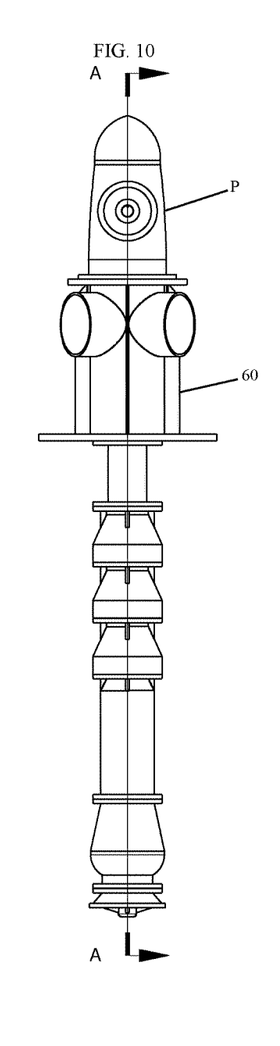
FIG. 10 is an elevation view of a preferred embodiment of the apparatus of the present invention.
Figure 11:
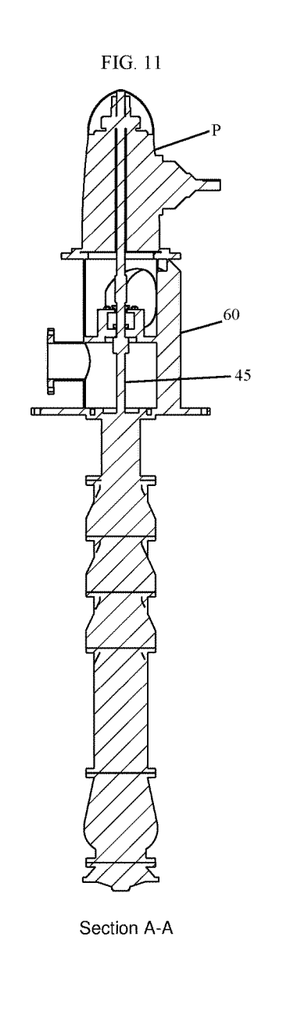
FIG. 11 is a sectional view taken along line A-A of FIG. 10 of a preferred embodiment of the apparatus of the present invention.
Figure 12:
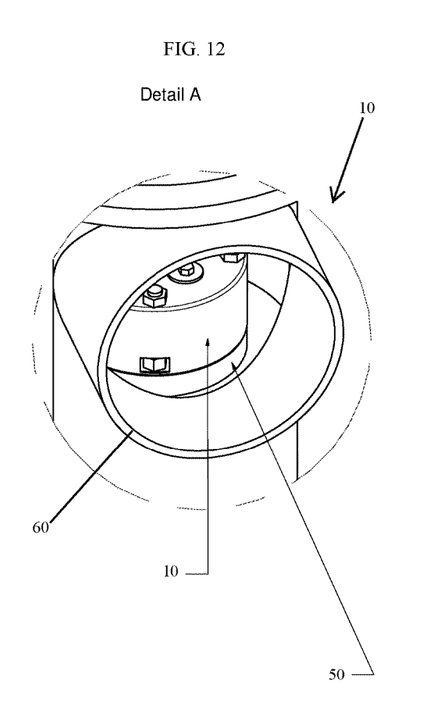
FIG. 12 is a fragmentary perspective view of a preferred embodiment of the apparatus of the present invention.
Figure 13:
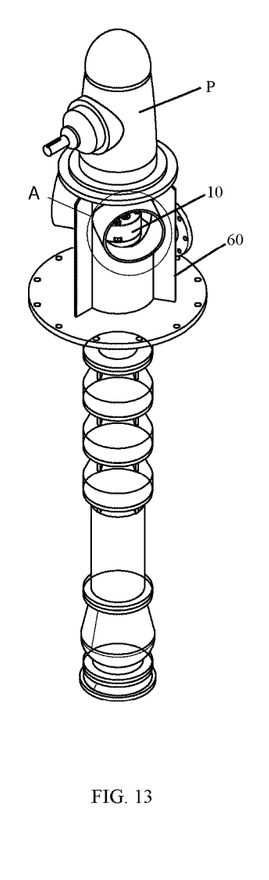
FIG. 13 is a perspective view of a preferred embodiment of the apparatus of the present invention.
Figure 14:
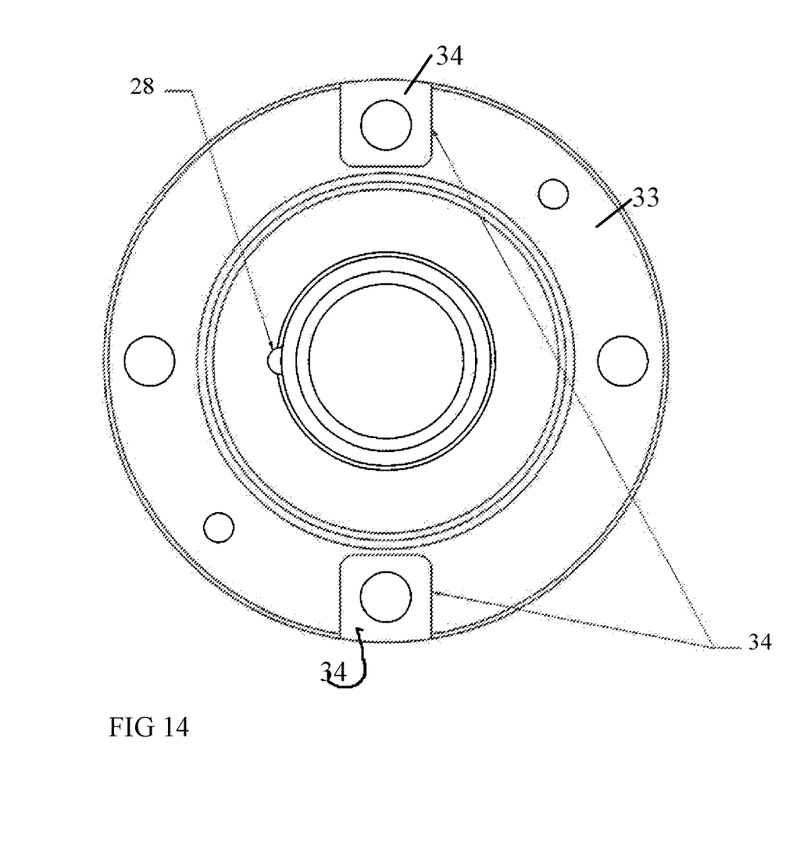
FIGS. 14-15 are partial views of a preferred embodiment of the apparatus of the present invention.

In FIGS. 8-9, studs 55 are used to secure both failed seal 50 and rescue seal 10 to pump housing 60. The studs 55 are preferably sized ½" to ¾" in diameter. More preferably, the studs 55 are ⅝" in diameter. The rescue seal 10 can be added on top of a failed seal 50 in place of an overhead bearing assembly or an OBA. The rescue seal 10 will limit loss of product and reduce the chance of a spill or release of a pressurized product.

Figure 15:
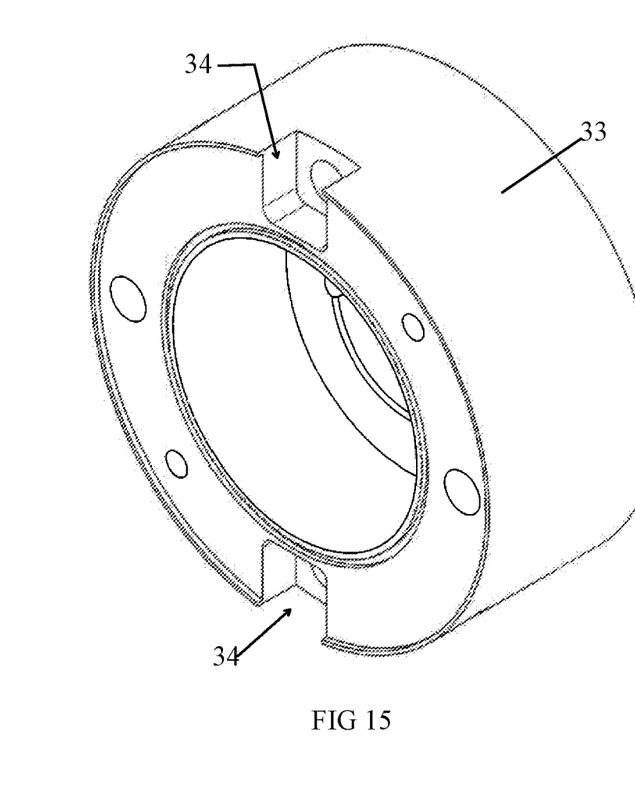
Figure 16:
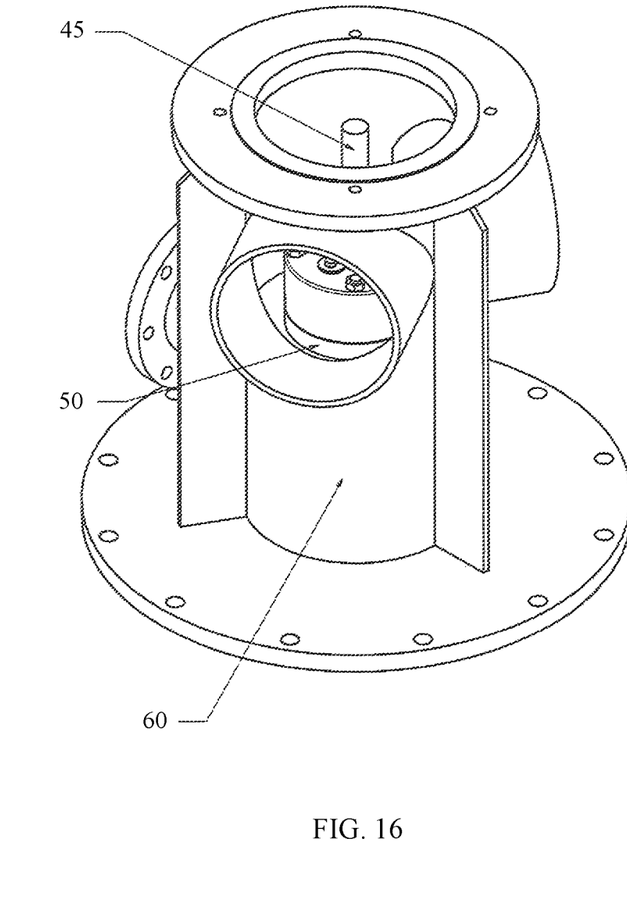
FIGS. 16-18 are fragmentary views of a preferred embodiment of the apparatus of the present invention.
Figure 17:
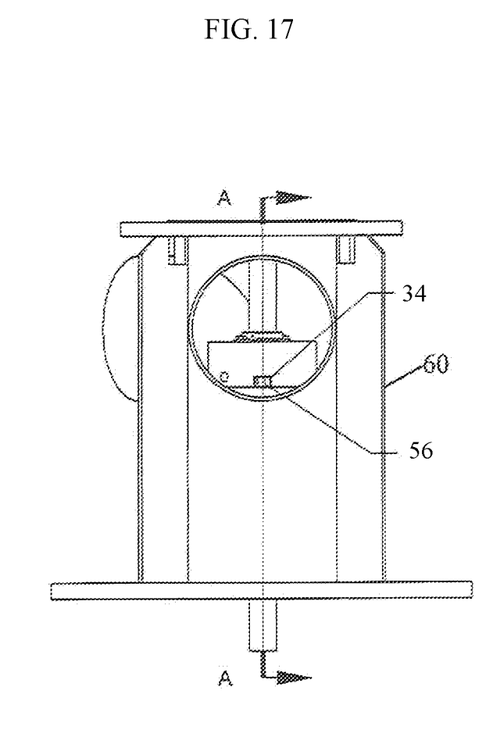
Figure 18:
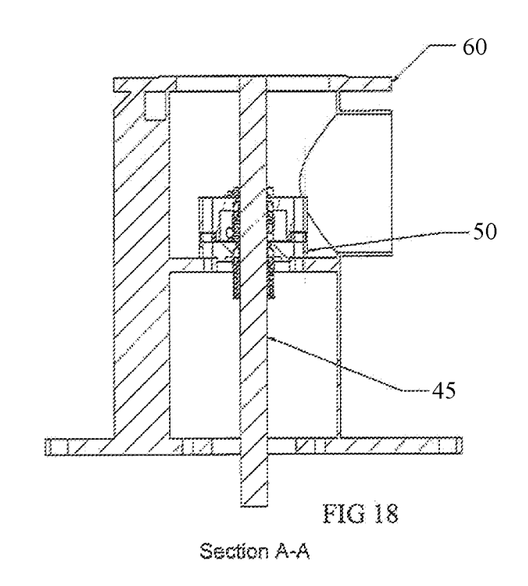

In order to install the rescue seal, the bolts securing the seal (and if equipped) the OBA to the pump are replaced with four (4) studs 55 (see FIG. 17). The primary or failed seal 60 is normally secured to housing 60 with bolts. FIGS. 19-23 thus show the method of the present invention, installation of the rescue seal 10. The pump P is disassembled to expose the old or damaged seal 50. Such a disassembly is known and a normal procedure to replace a seal. In FIG. 15, the old/damaged seal 50 remains in place. Two (2) of the four (4) bolts that normally hold the old seal 50 in place are removed and replaced with studs 55 (see FIG. 15). Nuts 56 are then installed on the studs 55 as seen in FIGS. 8-9 and 17. The remaining two (2) bolts that were not removed in FIG. 15 are then removed and replaced with studs 55 (see FIG. 17). The rescue seal 10 is then lowered down upon pump shaft 45 and over the old seal 50. The reliefs or cut outs 34 register with the nuts 56 placed in FIG. 17.

In order to install the rescue seal 10, two (2) of the four (4) nuts are thus removed. The rescue seal 10 is lowered over the failed seal 50 and onto the studs 55. Once in place, four (4) nuts 56 are installed on top of the rescue seal 10 thus securing both the rescue seal 10 and failed primary seal 50 to the pump shaft 45 and housing 60 (see FIGS. 8-9 and 19-23). The pump P is reassembled and set normally. As a final step, tighten the rescue seal 10 drive collar set screws and remove the seal set blocks. The set blocks are two (2) round Teflon disks that are installed while the seal is being built. Their purpose is to pre-load the springs urging the two (2) seal faces to stay together. They are also a fool proof and easy method for setting the seal. Once the drive collar set screws are tightened, the seal stays set and the set blocks are no longer needed. The pump P can then be returned to service to complete offload of product from a barge, vessel, tank or the like.

The present invention also includes a method of replacing a failed pump seal 50 of a pump P having a pump housing 60 and a rotating pump shaft 45. The method preferably comprises the steps of:

(1) providing a rescue seal 10;
(2) attaching studs 55 to the pump housing 60;
(3) securing the failed seal 50 to the studs 55 with nuts 56;
(4) placing the rescue seal 10 on the pump shaft 45 above the failed seal 50 so that the pump shaft 45 extends through both the failed seal 50 and the rescue seal 10; and
(5) placing nuts 56 on the studs 55 to secure the rescue seal 10 to the studs 55 above the failed seal 50.

Preferably, some of the fasteners that secure the failed seal 50 to the housing 60 are removed before the studs 55 are attached.

Preferably, the pump housing 60 includes a pump discharge head and the studs 55 are connected to the pump discharge head.

Preferably, nuts 56 attached to the studs 55 secure both the failed seal 50 and the rescue seal 10 to the pump housing 60 and shaft 45.

Preferably, the rescue seal 10 has a housing or sleeve 11 with recesses 18 that are receptive of the nuts 56 securing the failed seal 50.

In some embodiments, the method of the present invention further comprises a step of installing a drive collar 37 using set screws 38. In this embodiment, the rescue seal 10 preferably further comprises set blocks 35 that are installed while the rescue seal 10 is being manufactured to pre-load springs 13 which when the rescue seal 10 is properly installed urge the two seal faces (the faces of the failed seal 50 and the rescue seal 10) to stay together. These set blocks 35 can be seen in FIGS. 1-3. Preferably, this method also includes a step of removing the set blocks after the drive collar 37 and set screws 38 are tightened.

The apparatus of the present invention includes a rescue seal apparatus 10 for repairing a failed pump seal 50 of a pump P having a pump housing 60, a rotating pump shaft 45, and a drive collar 37 secured to the shaft 45 with set screws 38. Preferably, the rescue seal 10 comprises studs 55 for attachment to the pump housing 45 in place of bolts which hold the failed seal 50 in place; a rescue seal 10 for placement on the pump shaft 45 above the failed seal 50 so that the pump shaft 45 extends through both the failed seal 50 and the rescue seal 10; nuts 56 for securing the failed seal 50 to the studs 55 and for securing the rescue seal 10 to the studs 55 above the failed seal 50; and set blocks that are installed while the rescue seal 50 is being manufactured to pre-load springs 13 which when the rescue seal 10 is properly installed urge two seal faces (the faces of the failed seal 50 and the rescue seal 10) to stay together, wherein the set blocks may be removed after the drive collar set screws 38 are tightened. Preferably, the rescue seal 10 has a housing or sleeve 11 with recesses 18 that are receptive of the nuts 56 securing the failed seal 50.

Figure 19:
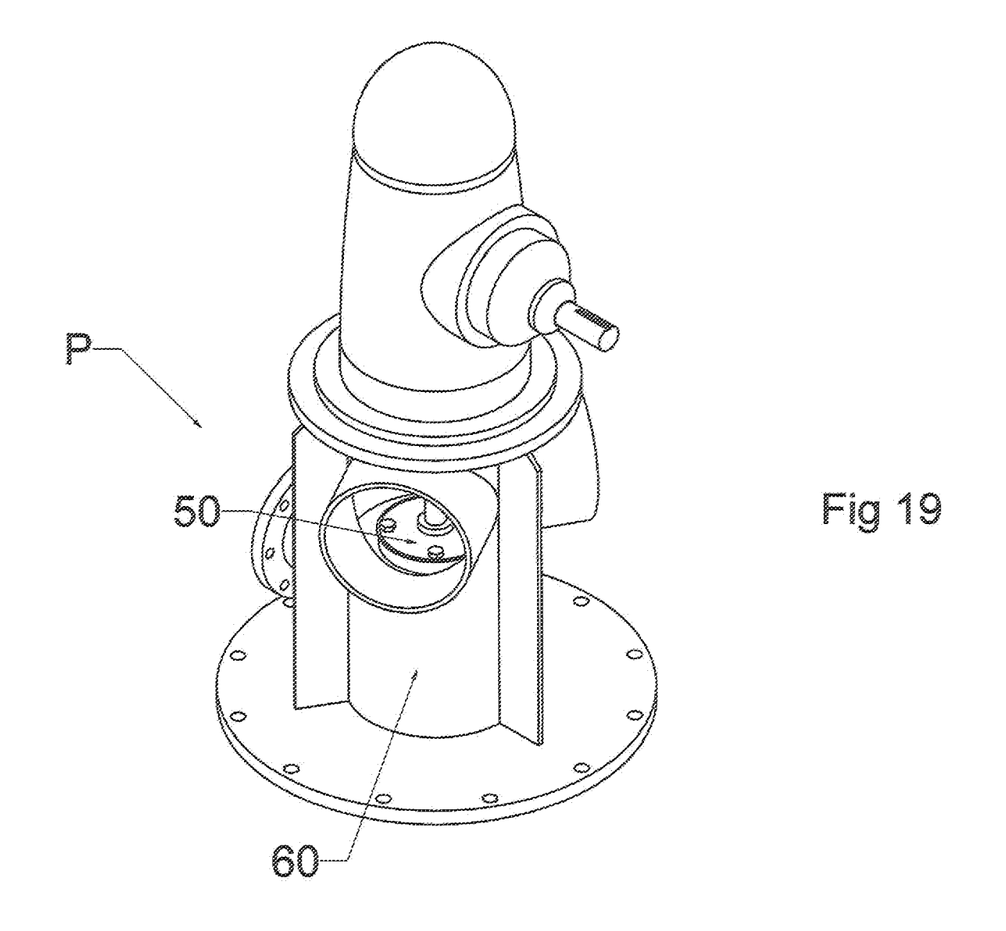
FIGS. 19-23 are perspective views that show the method of the present invention.
Figure 20:
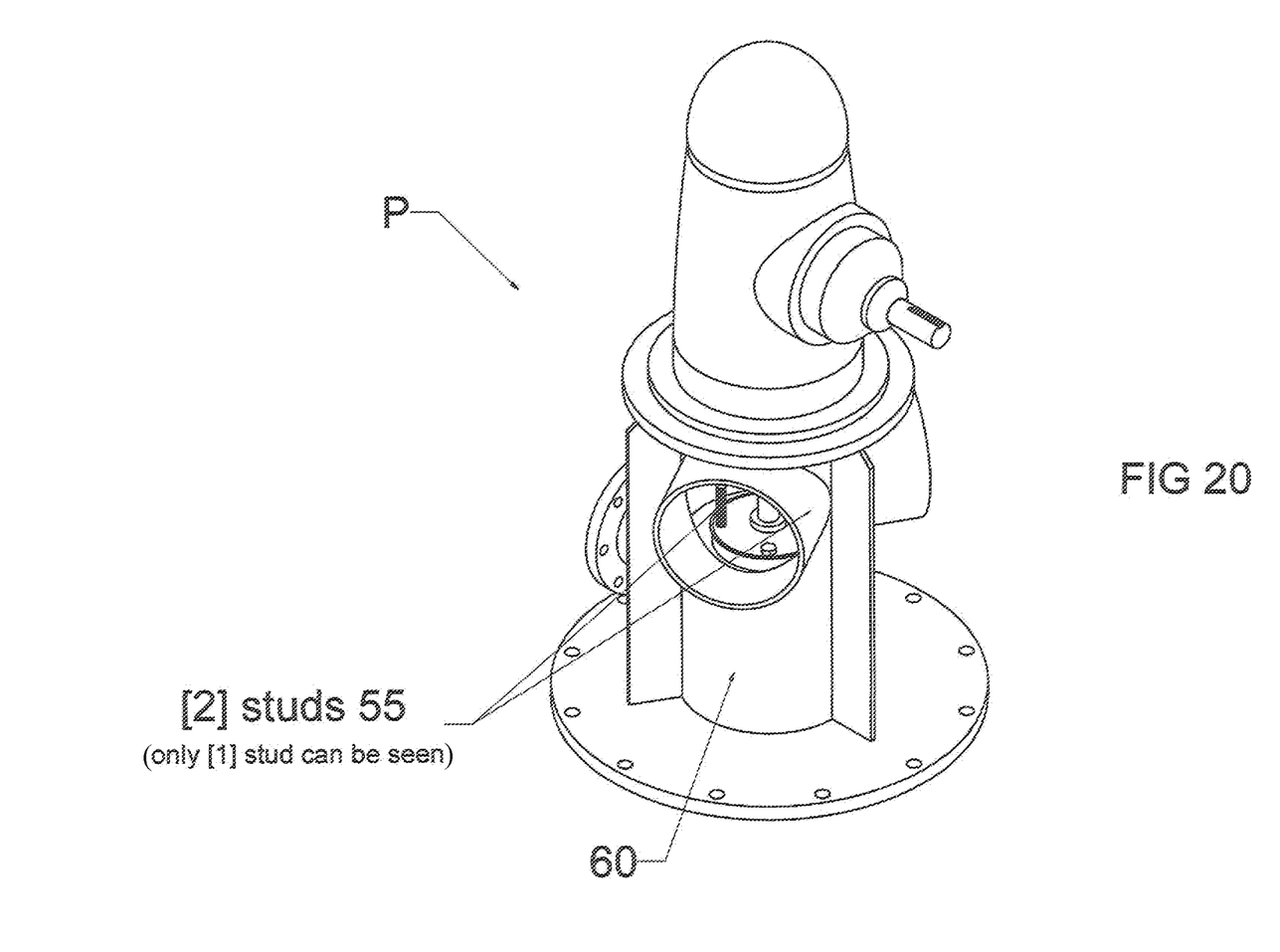
Figure 21:
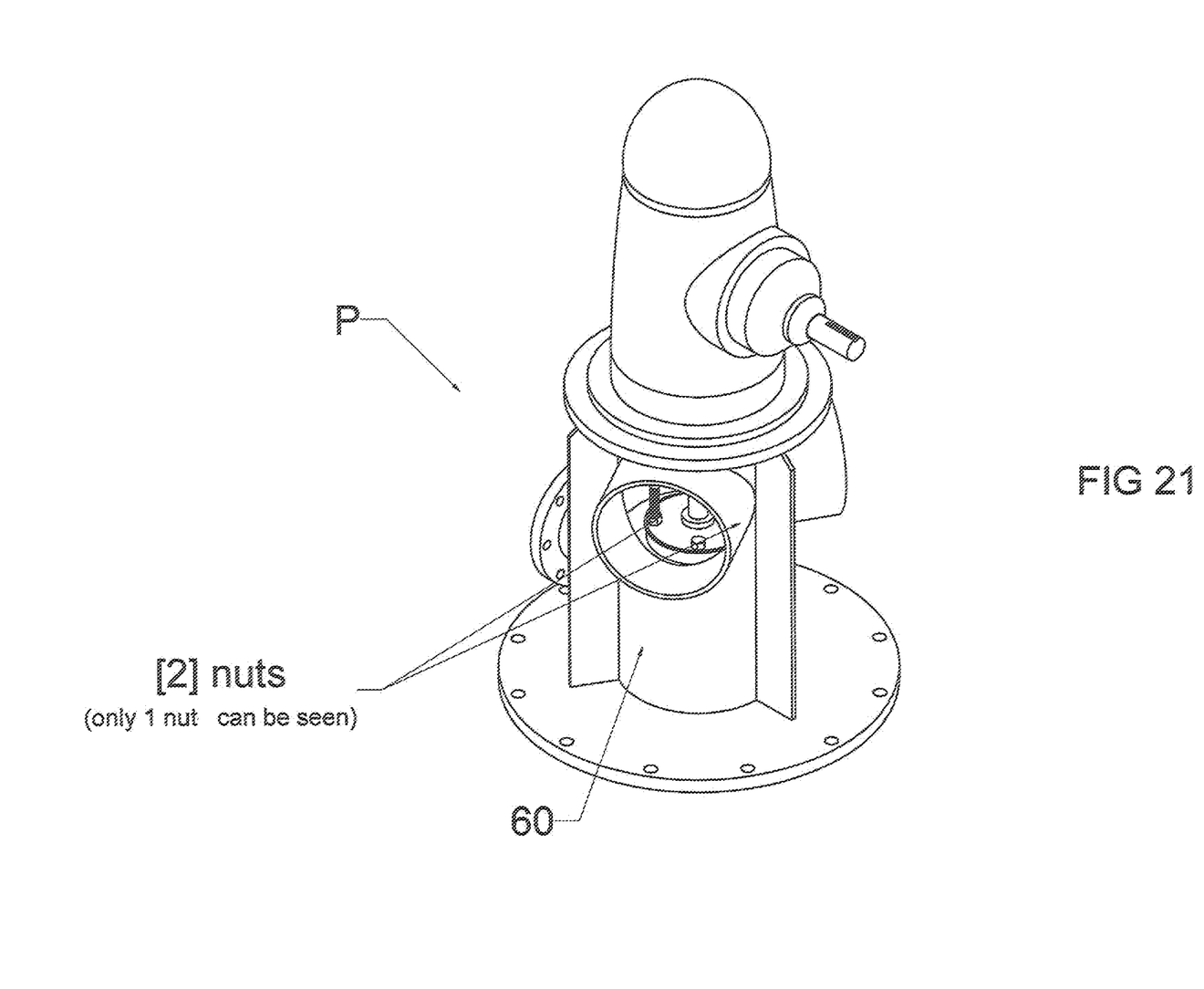
Figure 22:
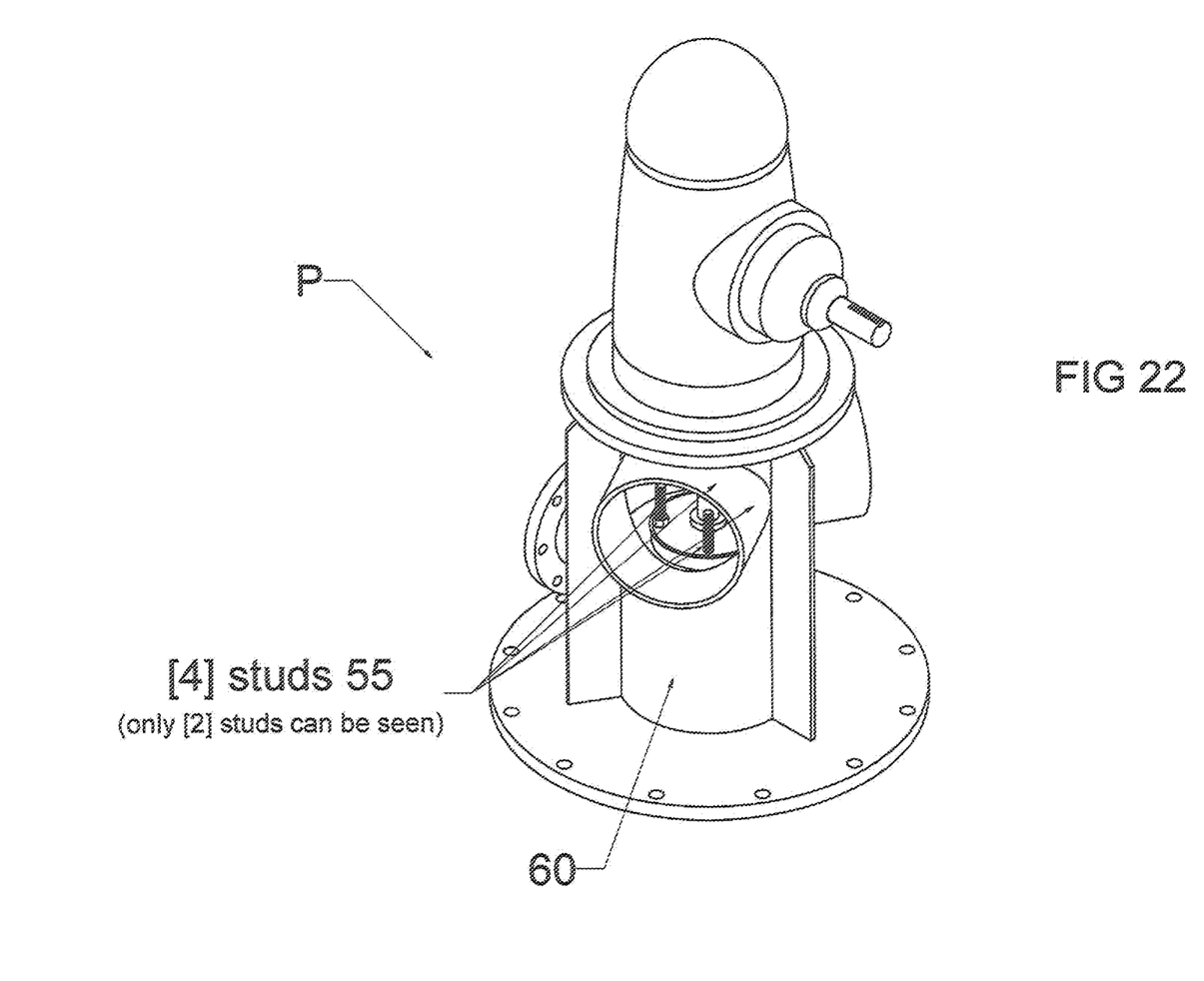
Figure 23:
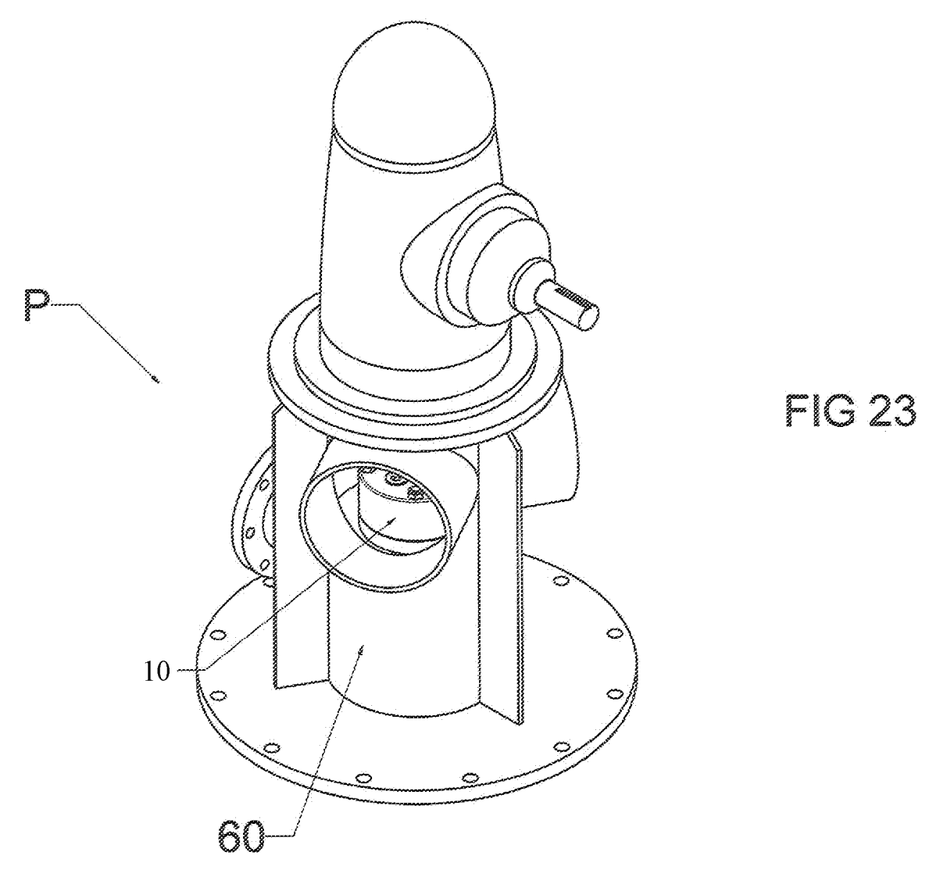

The method of the present invention can be seen in FIGS. 19-23. The first step is to disassemble to pump as shown in FIG. 19 (this is the normal procedure to replace a seal). Second, the old/damaged seal 50 is left in place. Two of the four bolts from the failed seal 50 are replaced with studs 55 as shown in FIG. 20. Third, nuts 56 are installed on the just installed studs 55 and tightened as shown in FIG. 21. Fourth, the remaining two bolts from the failed seal 50 are removed and replaced with studs 55; however, no nuts 56 are installed on these last two studs 55 as shown in FIG. 22. Finally, the rescue seal is lowers down the pump shaft 45 and over the failed seal 50 making sure that the 34 in the rescue seal ago over the nuts 56 on the studs 55 as shown in FIG. 23. Four additional nuts 56 are installed and tightened on the rescue seal as shown in FIG. 23. The pump P can now be reassembled as normal. The drive collar 37 set screws 38 are tightened, and the seal set blocks 35 can be removed. The pump can now return to normal service.

The following is a list of parts and materials suitable for use in the present invention:

PARTS LIST

Part Number Description
10 rescue mechanical seal
11 seal sleeve
12 outer surface
13 rotating face spring
14 opening
15 annular skirt
16 larger diameter section/lower section
17 smaller diameter section/upper section
18 notch/recess
19 lower projection
20 rotating face driver
21 upper projection
22 notch/recess
23 rotating seal faces
24 o-ring
25 o-ring
26 annular recess
27 stationary seal face
28 anti-rotation pin
29 o-ring
30 annular recess
31 annular recess
32 bushing
33 seal cover
34 nut cutout
35 set blocks or preload spacer
36 bolt spacer retainers
37 drive collar
38 set screw
39 half-moon recess
40 sleeve bore
45 pump shaft
50 failed seal
55 studs
56 nut
60 pump housing
P pump

The invention claimed is:

1. A method of replacing a failed pump seal of a pump having a pump housing and a rotating pump shaft, comprising the steps of:
providing a rescue seal;
attaching threaded studs to the pump housing;
securing the failed seal to the studs with nuts;
placing the rescue seal on the pump shaft above the failed seal so that the pump shaft extends through both the failed seal and the rescue seal; and
placing nuts on the studs to secure the rescue seal to the studs above the failed seal.

2. The method of claim 1 wherein some of the nuts that secure the failed seal to the housing are removed before the studs are attached.

3. The method of claim 2 wherein the pump housing includes a pump discharge head and the studs are connected to the pump discharge head.

4. The method of claim 1 wherein nuts attached to the studs secure both the failed seal and the rescue seal to the pump housing and shaft.

5. The method of claim 1 wherein the rescue seal has a housing with recesses that are receptive of nuts securing the failed seal.

6. The method of claim 1, further comprising installing a drive collar using set screws, wherein the failed seal and the rescue seal each have seal faces, and wherein the rescue seal further comprises set blocks that are installed while the rescue seal is being manufactured to pre-load springs which when the rescue seal is properly installed urge the two seal faces (the faces of the failed seal and the rescue seal) to stay together, and further comprising removing the set blocks after the drive collar set screws are tightened.

* * * * *